United States Patent Office 2,723,956
Patented Nov. 15, 1955

2,723,956

BOILER SCALE REDUCTION USING A COPOLYMER OF MALEIC ANHYDRIDE AND ANOTHER MONOETHYLENIC COMPOUND

Carl E. Johnson, Westchester, Ill., assignor to National Aluminate Corporation, Chicago, Ill., a corporation of Delaware No Drawing. Application September 26, 1950,
Serial No. 186,920

15 Claims. (Cl. 210—23)

This invention relates to the reduction and prevention of scale in steam boilers.

In steam boilers where water is boiled to generate steam one of the more troublesome problems encountered has been the tendency of the water containing any hardness to deposit this hardness as scale on the heat exchanging surfaces. The scale reduces the heat transfer across the heat exchanging surface so that there is an increased tendency for the metal to overheat. This can and often does lead to rupture of boiler exchange surfaces. Present boiler scale reduction practice is to employ compounds such as tannins, modified lignins, algins and other complex organic compounds to prevent the formation of scale on the metal surfaces. The employment of these compounds has one or more of the following disadvantages: (1) oxidization in the boiler; (2) decomposition on the metal surface with deposition of carbon on the metal and failure due to overheating in high pressure boilers; (3) the requirement of relatively large amounts to in-inhibit scale; (4) certain types of scale, such as magnesium phosphate, are unaffected by conventional types of organic compounds; and (5) conventional boiler scale inhibitors are highly colored so that steam that is contaminated by carryover cannot be used for food processing or other purposes where color and contamination are factors.

One of the objects of the present invention is to provide a boiler scale treatment which avoids many of the disadvantages of previously used treatments.

Another object is to provide new and useful boiler scale reducing compositions which have a wide range of application. Other objects will appear hereinafter.

It has now been found that polymeric compounds containing adjacent carboxy groups are very effective in preventing the formation of calcium carbonate scale at low steam pressures and of calcium and magnesium phosphates in high pressure boilers. Many of these compounds are white solids which dissolve in alkaline solution to form slightly viscous to viscous solutions that are practically colorless.

These polymeric compounds are characterized by having two carboxylic acids adjacent to one another and spaced along the polymeric chain. A convenient way to prepare such polymers is to copolymerize maleic anhydride with other polymerizable mono-ethylenic compounds such as methyl vinyl ether, ethyl vinyl ether, styrene, alpha-methyl styrene, vinyl acetate, methyl methacrylate, isopentene, amylene, diisobutylene, isoheptene, nonene, dipentene, ethyl cinnamate or abietic acid. The resultant polymeric compound need not contain the free carboxylic acid groups. Any group may be present which will revert to the salt form in the presence of the high alkalinity used in boiler waters. For instance, ester or acid anhydride derivatives of these polymers can be used in place of the free acids.

A large number of copolymers of maleic anhydride and other monoethylenic compounds have been prepared but for the purpose of the present invention the most effective copolymers are the reaction products of maleic anhydride with another polymerizable monoethylenic compound in molecular ratios of 1:1 to 2:1. Although substantially equimolecular ratios may be used, a slight excess of maleic anhydride is preferred. The reaction is run in an open vessel at atmospheric pressures if the reactants are non-volatile at the temperature of the reaction or in a closed vessel under superatmospheric pressures if one or more of the reactants are volatile.

Temperatures of 80 degrees C. to 120 degrees C. are preferably used in making the desired products. In some cases, temperatures as low as room temperatures (25 degrees C.) can be employed where the reaction period is sufficiently long.

At the preferred temperatures of 80 degrees C. to 120 degrees C. the reaction may be effected in two to twenty-two hours, the length of time varying with specific reactants.

Catalysts of the peroxide type which are known to catalyze this type of reaction are preferably employed, e. g., benzoyl peroxide or cumene hydroperoxide.

Any inert solvent may be used in carrying out the invention. Good results have been obtained with methyl ethyl ketone, n-heptane, benzene and xylene.

The reaction products are solids which either precipitate out of the reaction solvent or are obtained by removing the solvent. Sometimes these products are soluble in water but it is preferable, before adding them to the boiler, to convert them to their sodium salts, which are always water soluble.

The preparation of various copolymers suitable for the practice of the invention is illustrated by the following examples.

EXAMPLE I

α-Methyl styrene-maleic anhydride copolymer

Charge:

| | |
|---|---|
| α-Methyl styrene | 15 grams (0.127 mol). |
| Maleic anhydride | 19 grams (0.194 mol). |
| Benzoyl peroxide | .2 gram. |
| Benzene | 70 grams. |

*Procedure.*—The above charge was placed in a 250 ml. Erlenmeyer flask equipped with a reflux condenser. The mixture was reacted in the steam bath for 30 hours. The benzene was decanted off and the polymer was dissolved with methyl ethyl ketone. The polymer was precipitated with petroleum ether. The liquid was decanted off and the resin dried.

*Data on the resin.*—Light, white, brittle resin. Equivalent weight—195.6.

The addition of excess maleic anhydride gives a resin with better carbonate scale reduction property. The use of different solvents, such as n-heptane, benzene or xylene, in the copolymerization does not seem to alter the scale preventive property substantially.

EXAMPLE II

Dipentene-maleic anhydride copolymer

Charge:

| | |
|---|---|
| Dipentene | 27 grams |
| Maleic anhydride | 25 grams |
| Benzoyl peroxide | 0.5 gram |
| Methyl ethyl ketone | 45 ml. |

*Procedure.*—The above charge was placed in a 500 ml. 3-necked round bottom flask equipped with a thermometer, stirrer and reflux condenser. The mixture was reacted at 97 degrees C. for 6 hours giving a reddish brown polymer (insoluble in methyl ethyl ketone) and a viscous solution. Petroleum ether was added and heated in the steam bath for 10 minutes. The liquid was decanted off and the resin was dried on the steam bath.

*Data on the resin.*—Brittle, light orange, hard resin. Equivalent weight—131.8.

EXAMPLE III

*Dipentene-maleic anhydride copolymer*

Charge:
| | |
|---|---|
| Dipentene | 27 grams |
| Maleic anhydride | 20 grams |
| Benzoyl peroxide | 0.5 gram |
| Methyl ethyl ketone | 45 ml. |

*Procedure.*—The above charge was placed in a 500 ml. 3-necked round bottom flask equipped with a thermometer, stirrer and reflux condenser. The mixture was reacted at 97 degrees C. for 6 hours giving a reddish brown polymer (insoluble in methyl ethyl ketone) and a viscous solution. Petroleum ether was added and heated in the steam bath for 10 minutes. The liquid was decanted off and the resin was dried on the steam bath.

*Data on the resin.*—White, powdery resin. Equivalent weight—107.4.

EXAMPLE IV

*Amylene-maleic anhydride copolymer*

Charge:
| | Grams |
|---|---|
| Amylene (mixed) | 20 |
| Maleic anhydride | 20 |
| Benzoyl peroxide | 0.5 |
| Methyl ethyl ketone | 10 |

*Procedure.*—The above charge was placed in a high pressure rocking bomb. The pressure was built up to 600 pounds per square inch with nitrogen gas. The mixture was reacted at 170 degrees F. for 30 hours. The yellow viscous solution was poured into pretroleum ether where the polymer precipitated out. The resin was washed several times with petroleum ether and dried on the steam bath.

*Data on the resin.*—Equivalent weight—135.4.

EXAMPLE V

*Methyl methacrylate-maleic anhydride copolymer*

Charge:
| | Grams |
|---|---|
| Methyl methacrylate | 10 |
| Maleic anhydride | 10 |
| Benzoyl peroxide | 0.05 |

*Procedure.*—The above charge was placed in a 500 ml. 3-necked round bottom flask equipped with a reflux condenser and a stirrer. The mixture was reacted at 80 degrees C. for 22 hours. The polymer was dissolved in methyl ethyl ketone and the solution was poured slowly into hot petroleum ether. The liquid was decanted off and the resin was dried at 100 degrees C. for 22 hours.

*Data on the resin.*—Hard brown resin. Equivalent weight—208.3. Nsp/c—.21.

EXAMPLE VI

*Maleic anhydride-vinyl acetate copolymer*

Charge:
| | Parts by weight |
|---|---|
| Maleic anhydride | 100 |
| Vinyl acetate | 172 |
| Methyl ethyl ketone | 200 |
| Benzoyl peroxide | 0.8 |

*Procedure.*—The above charge was refluxed for six hours. The resulting viscous solution was diluted with an equal volume of methyl ethyl ketone and the polymer precipitated with petroleum ether. The proportions, solvent, catalyst and time of reaction may be varied. The reaction, though much more vigorous, may be accomplished without a solvent.

*Data on the resin.*—A white and slightly pink solid which is completely water soluble.

EXAMPLE VII

*Diisobutylene-maleic anhydride copolymer*

The procedure was the same as in Example II. The weight ratio of diisobutylene to maleic anhydride was 25 grams to 20 grams, the reaction temperature 80 degrees C. and the time of reaction 17 hours. The equivalent weight of the product was 123.4 and the viscosity (Nsp/c) was 0.061.

EXAMPLE VIII

*Maleic anhydride-isoheptene copolymer*

The procedure was the same as Example II except that isoheptene (21 grams) was substituted for dipentene, the temperature was 80 degrees C., the time of reaction was 36 hours and the quantity of maleic anhydride was 27 grams. The equivalent weight of the product was 112.2 and the viscosity (Nsp/c) was 0.055.

EXAMPLE IX

*Maleic anhydride-nonene copolymer*

The procedure was the same as Example II except that 25 grams of nonene were used instead of the dipentene, the temperature was 80 degrees C., the quantity of maleic anhydride 20 grams, and the time of reaction 35 hours. The equivalent weight of the product was 83.5 and the viscosity (Nsp/c) was 0.024.

EXAMPLE X

*Maleic anhydride-methyl vinyl ether copolymer*

The procedure was the same as Example VI except that equivalent proportions of methyl vinyl ether were used instead of vinyl acetate.

EXAMPLE XI

*Maleic anhydride-styrene copolymer*

The procedure was the same as in Example I except that equivalent proportions of styrene were used instead of alpha methyl styrene.

EXAMPLE XII

*Maleic anhydride-ethyl cinnamate copolymer*

The procedure was the same as in Example VI except that the equimolecular proportions of ethyl cinnamate and maleic anhydride were used instead of vinyl acetate and maleic anhydride.

EXAMPLE XIII

*Maleic anhydride-methyl acrylonitrile copolymer*

The procedure was the same as Example V except that the equivalent proportions of methyl acrylonitrile were used instead of methyl methacrylate.

EXAMPLE XIV

*Maleic anhydride-ethyl vinyl ether copolymer*

The procedure was the same as Example VI except that equimolecular proportions of ethyl vinyl ether and maleic anhydride were used instead of vinyl acetate and maleic anhydride.

It will be understood that the copolymers may be prepared without catalysts. However, the use of catalysts is desirable.

As will be noted the number of carbon atoms in the monomer which is polymerized with the maleic anhydride may vary widely, being as low as 4 in the case of vinyl acetate and as high as 20 in the case of abietic acid.

In the foregoing Examples, the product may be obtained as a concentrate of its salt by first steam distilling the volatile organic solvent after polymerization and then adding an alkali, e. g., sodium hydroxide, sufficient to neutralize the polybasic acid polymer. The salt solution can be concentrated and used in that form. The dried sodium salt can be used but is relatively hygroscopic.

The salts and salt solutions are stable and dissolve in boiler water rapidly.

Boiler tests demonstrated that the maleic anhydride copolymers are effective in reducing scale in low pressure boilers (100 to 500 pounds per square inch steam pressure) as well as in high pressure boilers (1000 to 1500 pounds per square inch steam pressure). It will be understood that the relative effectiveness varies somewhat with different copolymers and with different types of scale.

The following table illustrates the effectiveness of the alkali soluble maleic anhydride copolymers in reducing boiler scale under the conditions indicated.

| Test No. | Copolymer of Maleic Anhydride | Moles | Amount Added to Water, Grains per Gallon | Boiler Pressure, Pounds per Square Inch | Percent Scale Reduction |
|---|---|---|---|---|---|
| 1 | Maleic-alpha methyl styrene. | .112 / .1 | 2.0 | 1,500 | 85 |
| 2 | do | .112 / .1 | 1.0 | 1,500 | 50 |
| 3 | maleic-styrene | .6 / .4 | 2.0 | 1,500 | 90 |
| 4 | do | .254 / .195 | 2.0 | 1,500 | 50 |
| 5 | maleic-alpha methyl styrene. | .184 / .127 | 2.0 | 1,500 | 90 |
| 6 | do | .194 / .127 | 2.0 | 1,500 | 96 |
| 7 | maleic-dipentene (Example II). | .32 / .3 | 2.0 | 1,500 | 75 |
| 8 | do | .32 / .3 | 2.0 | 250 | 85 |
| 9 | maleic-diisobutylene (Example VIII). | .204 / .223 | 0.5 | 250 | 80 |
| 10 | maleic-amylene (Example IV). | .204 / .286 | 0.5 | 250 | 90 |
| 11 | do | .204 / .286 | 2.0 | 1,500 | 90 |
| 12 | do | .204 / .286 | 1.0 | 1,500 | 90 |
| 13 | maleic isoheptene (Example VIII). | .214 / .214 | 0.5 | 250 | 90 |
| 14 | maleic-nonene (Example IX). | .214 / .214 | 0.5 | 250 | 75 |
| 15 | maleic-vinyl acetate (Example VI). | 1.0 / 2.0 | 2.0 | 250 | 75–85 |
| 16 | maleic-methyl vinyl ether (Example X). | 1.0 / 1.0 | 0.5 | 250 | 85 |
| 17 | do | 1.0 / 1.0 | 2.0 | 250 | 90 |
| 18 | Maleic-ethyl vinyl ether. | 0.26 / 0.26 | 2.0 | 250 | 85 |
| 19 | Maleic-ethyl cinnamate. | 0.1 / 0.1 | 1.9 | 250 | 85 |
| 20 | Maleic-methacrylonitrile. | 0.3 / 0.3 | 2.0 | 250 | 70 |
| 21 | Maleic-abietic acid | 0.97 / 0.06 | 2.0 | 1,500 | 20 |
| 22 | Maleic-methyl methacrylate. | 0.153 / 0.15 | 2.0 | 250 | 85 |
| 23 | Maleic-alpha methyl styrene. | 0.214 / 0.127 | 0.5 | 250 | 85 |
| 24 | Maleic-vinyl cyclohexene. | 0.1 / 0.1 | 2.0 | 250 | 75 |

In the boiler scale tests referred to in the foregoing table the boilers used corresponded to those described by Holmes and Jacklin "Experimental studies of boiler scale at 800 p. s. i." reported in Proceedings of Fourth Annual Water Conference, November 1–2, 1943, and "Experimental studies of boiler scale at 1500 p. s. i." reported in Proceedings of Sixth Annual Water Conference, October 22–23, 1945.

For the tests at 250 p. s. i. a dilute Hinsdale, Illinois water was used (Ca hardness=9 grains per gallon, magnesium hardness=5 grains per gallon, M=10.5) which was treated with NaHCO$_3$ to give an M of 25 grains per gallon in the boiler at 10 concentrations. Fifty gallons of this water were evaporated in an inclined tube boiler of the type previously referred to and treatment with the maleic anhydride copolymer was added to the feed water in the quantity previously described. As will be apparent to those skilled in the art, the water used produces carbonate scale which is inhibited by the maleic anhydride copolymer.

In the tests at 1500 p. s. i. the water used contained 1 grain per gallon of calcium and was treated with NaHCO$_3$ and Na$_2$HPO$_4$ to give an M of 20 grains per gallon (g. p. g.) and a PO$_4$ concentration of 50 parts per million (p. p. m.) in the boiler water at 10 concentrations. Fifty gallons of this water were evaporated in a horizontal tube boiler and the maleic anhydride copolymer was added to the feed water in the quantities previously described.

Although calcium carbonate and calcium phosphate scales are most often encountered in commercial practice, tests were also made on calcium silicate, magnesium hydroxide and magnesium phosphate scale. As an illustration of the effectiveness of specific maleic anhydride copolymers on different types of scale, a maleic anhydride-methyl vinyl ether copolymer gave 85% to 95% calcium carbonate scale reduction at 0.5 to 2.0 g. p. g. in Hinsdale water at 250 p. s. i.; 35% magnesium hydroxide scale reduction at 2.0 g. p. g. in a synthetic water at 250 p. s. i.; 50% calcium silicate scale reduction at 2.0 g. p. g. in a synthetic water at 250 p. s. i.; 98% calcium and magnesium phosphate scale reduction at 2.0 g. p. g. in synthetic waters at 250 p. s. i.; and 20% calcium phosphate scale reduction at 2.0 g. p. g. in a synthetic water at 1500 p. s. i.

Especially good results in reducing magnesium phosphate scale in boilers operating at 1500 p. s. i. were obtained with maleic anhydride-alpha methyl styrene copolymers having a molecular ratio of maleic anhydride to alpha methyl styrene within the range of 1:1 to 1.5:1. The same materials also produced good scale reduction of calcium phosphate scale at 1500 p. s. i. and were effective in reducing carbonate and phosphate scale at 250 p. s. i.

Good results under low and high pressure conditions were obtained with monoethylenic hydrocarbon-maleic anhydride copolymers, especially maleic anhydride-amylene, maleic anhydride-diisobutylene, maleic anhydride-isoheptene, and maleic anhydride-nonene copolymers in which the molar ratio was 1–1.5:1. The percent scale reduction was nearly the same with different alkyl groups attached to the ethylenic group.

In the case of the maleic anhydride-vinyl acetate copolymer good scale reduction was obtained with a molar ratio of maleic anhydride to vinyl acetate of 1:2. However, where the vinyl group is connected to an aromatic ring, as in styrene, the effectiveness of the copolymers in reducing phosphate scale at high steam pressures is reduced when the quantity of styrene is below a maleic anhydride-styrene molar ratio of 1:1.

The copolymers of maleic anhydride with either methyl vinyl ether or ethyl vinyl ether gave very satisfactory carbonate scale reduction.

In general, the copolymers employed for the purpose of the invention are especially advantageous because they are light in color, effective in low dosages, do not have bad carry over effects and are useful in controlling types of scale unaffected by other types of organic treatment used heretofore.

The quantities of the copolymers employed may be varied. Usually, effective results are obtained by adding 0.5 to 2.0 grains of copolymer per gallon of boiler feed water.

The term "monoethylenic compound" as used herein refers to a compound containing a single aliphatic

group in which the valence bonds are linked either to hydrogen atoms or to carbon atoms of an aliphatic, cycloaliphatic, or aromatic group. Since the lower olefines such as ethylene and propylene are gaseous at atmospheric temperatures and pressures, they require the use of superatmospheric pressures for polymerization. The most reactive polymerizable ethylenic compounds have double bond unsaturation at or near the end of an aliphatic carbon chain.

The term "alkyl" as used herein refers to methyl, ethyl, propyl, and higher homologues.

The invention is hereby claimed as follows:

1. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, said quantity being within the range of about 0.5 to 2.0 grains per gallon of feed water and being effective to reduce scale when said water is boiled, and boiling said water.

2. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, the molar ratio of maleic anhydride to said other polymerizable compound being within the range of 1:2 to 2:1, said quantity being within the range of about 0.5 to 2.0 grains per gallon of feed water and being effective to reduce scale when said water is boiled, and boiling said water.

3. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, said polymerizable monoethylenic compound containing 4 to 20 carbon atoms, said quantity being within the range of about 0.5 to 2.0 grains per gallon of feed water and being effective to reduce scale when said water is boiled, and boiling said water.

4. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, said polymerizable monoethylenic compound being a monovinyl aliphatic carboxylic acid ester, said quantity being within the range of about 0.5 to 2.0 grains per gallon of feed water and being effective to reduce scale when said water is boiled, and boiling said water.

5. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, said polymerizable monoethylenic compound being a monovinyl alkyl ether, said quantity being within the range of about 0.5 to 2.0 grains per gallon of feed water and being effective to reduce scale when said water is boiled, and boiling said water.

6. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, said polymerizable monoethylenic compound being a monoethylenic hydrocarbon, said quantity being within the range of about 0.5 to 2.0 grains per gallon of feed water and being effective to reduce scale when said water is boiled, and boiling said water.

7. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, the monoethylenic group forming at least part of a side chain which is linked to an aromatic group, said quantity being within the range of about 0.5 to 2.0 grains per gallon of feed water and being effective to reduce scale when said water is boiled, and boiling said water.

8. A method of reducing scale in boilers using scale-forming boiler water which comprises incorporating with said boiler water a quantity of a composition soluble in said boiler water from the group consisting of copolymers of maleic anhydride and another polymerizable monoethylenic compound and salts of said copolymers, the monoethylenic compound being a methacrylate, said quantity being within the range of about 0.5 to 2.0 grains per gallon of feed water and being effective to reduce scale when said water is boiled, and boiling said water.

9. A method of reducing scale in boilers using scale-forming boiler water which comprises incorporating with said boiler water a quantity of an alkali soluble copolymer of maleic anhydride and alpha methyl styrene, said quantity being within the range of about 0.5 to 2.0 grains per gallon of feed water and being effective to reduce scale when said water is boiled, and boiling said water.

10. A method of reducing scale in boilers using scale-forming boiler water which comprises incorporating with said boiler water a quantity of an alkali soluble copolymer of maleic anhydride and vinyl acetate, said quantity being within the range of about 0.5 to 2.0 grains per gallon of feed water and being effective to reduce scale when said water is boiled, and boiling said water.

11. A method of reducing scale in boilers using scale-forming boiler water which comprises incorporating with said boiler water a quantity of an alkali soluble copolymer of maleic anhydride and ethyl vinyl ether, said quantity being within the range of about 0.5 to 2.0 grains per gallon of feed water and being effective to reduce scale when said water is boiled, and boiling said water.

12. A method of reducing scale in boilers using scale-forming boiler water which comprises incorporating with said boiler water a quantity of an alkali soluble copolymer of maleic anhydride and methyl methacrylate, said quantity being within the range of about 0.5 to 2.0 grains per gallon of feed water and being effective to reduce scale when said water is boiled, and boiling said water.

13. A method of reducing scale in boilers using scale-forming boiler water which comprises incorporating with said boiler water a quantity of an alkali soluble copolymer of maleic anhydride and amylene, said quantity being within the range of about 0.5 to 2.0 grains per gallon of feed water and being effective to reduce scale when said water is boiled, and boiling said water.

14. A method of reducing scale in boilers using scale-forming boiler water which comprises incorporating with a feed water to the boiler about 0.5 to 2.0 grains per gallon of feed water of a composition soluble in said boiler water from the group consisting of copolymers of maleic anhydride and another polymerizable monoethylenic compound and salts of said copolymers, and boiling the resultant boiler water.

15. A method of reducing scale in boilers using scale-forming boiler water which comprises incorporating with a feed water to the boiler 0.5 to 2 grains of a copolymer per gallon of feed water, said copolymer being a copolymer of maleic anhydride and alpha methyl styrene copolymerized in a molar ratio within the range of 1:1 to 1.5:1 which is soluble in said boiler water, and boiling said water at steam pressures of 100 to 1500 pounds per square inch and the corresponding temperatures.

References Cited in the file of this patent

UNITED STATES PATENTS

| | | |
|---|---|---|
| 1,617,350 | Schenitza | Feb. 15, 1927 |
| 1,976,679 | Fikentscher et al. | Oct. 9, 1934 |
| 2,327,302 | Dittmar | Aug. 17, 1943 |

FOREIGN PATENTS

| | | |
|---|---|---|
| 559,240 | Germany | Sept. 16, 1932 |